United States Patent [19]

Tomen

[11] 4,196,919

[45] Apr. 8, 1980

[54] QUICK MOUNT TRANSFER TRAILER HITCH

[76] Inventor: Dan Tomen, 86 Paddock Green Cres., London, Ontario, Canada, N6J 3P7

[21] Appl. No.: 906,976

[22] Filed: May 17, 1978

[30] Foreign Application Priority Data

Apr. 10, 1978 [CA] Canada ................................ 300829

[51] Int. Cl.² ............................................. B60D 1/00
[52] U.S. Cl. ................................................... 280/502
[58] Field of Search ............... 280/502, 501, 500, 495, 280/503

[56] References Cited

U.S. PATENT DOCUMENTS

| | | | |
|---|---|---|---|
| 2,673,095 | 3/1954 | Fulton | 280/502 |
| 3,113,789 | 12/1963 | Safford | 280/502 |
| 3,220,749 | 11/1965 | Mathisen | 280/503 |
| 3,481,630 | 12/1969 | Parkhurst | 280/502 |
| 3,590,236 | 6/1971 | Ussery | 280/502 |
| 4,047,734 | 9/1977 | Miles | 280/495 |

Primary Examiner—John P. Silverstrim
Attorney, Agent, or Firm—Irvin A. Lavine

[57] ABSTRACT

A hitch assembly is disclosed which readily attaches itself to the bumper of an automobile and simultaneously secures the cross bar or draft bar of the hitch in a manner which requires no threading devices to obtain the securing action. In fact the securing action is by the simple movement of a lever into an over centered position on the hitch assembly and this in cooperation with two chains thereof, one attached to the upper margin and the other attached to the lower margin of the bumper or possibly the frame of the car securingly clasps not only the hitch assembly to the bumper but the draft bar to the hitch assembly. Preferably hitch assemblies are provided one at each end of the cross or draft bar. Thus with "snaps" of each lever into over center position the bumper hitch is secured to the automobile awaiting for connection of the trailer tow bar thereof for coupling to an awaiting trailer.

6 Claims, 11 Drawing Figures

QUICK MOUNT TRANSFER TRAILER HITCH

This invention relates to a bumper hitch for towing attachments and in particular to a quick means for mounting and removing a trailer hitch attachment from a bumper and the like.

A number of trailer hitches exist in the prior art which, on the one hand, attach themselves to a rear bumper of an automobile and thus provide an element, generally a ball, for attachment of towing bars and the like.

A species of such bumper hitches consists of a cross bar carrying a towing element mounted in its mid section, a pair of hitch assemblies connect to the ends of the said bar. Various variations for the actual connection means of the cross bar to the hitch assemblies have been disclosed as have been alternative means of attachment of the hitch assemblies to the bumper. All suffer from complicated mechanical arrangements either requiring the fixing of the cross bar in the hitch assembly prior to mounting of the assembly onto the bumper, or the securing of the hitch assembly to the bumper by threaded devices such as nuts and bolts including wing nuts. Some have features, however, which allow the adjustment of a towing element (ball) so as to accomodate various differentials in elevation between the bumper and the trailer towing bar.

I have conceived of a novel hitch assembly which attaches itself to the bumper and simultaneously secures the cross bar, or draft bar, to the hitch assembly in a manner which requires no threading devices to obtain this securing action. This is achieved by the simple movement of a lever into an over-centre position on the hitch assembly and this in cooperation with two chains, one attached to the upper margin and the other attached to the lower margin of the bumper or to the frame, securely clasps not only the hitch assembly to the bumper but the cross bar to the hitch assembly. Thus with two "snaps" the bumper hitch is secured awaiting connection of the trailer tow bar onto the coupling element of the bumper hitch.

Quick release for removal and adjustment is achieved by moving the lever from its over-centre position to its relaxed position.

In order to accomodate various forms of bumper a small adjusting screw is provided to the over-centre lever so as to regulate the distance that the lower chain may travel.

The invention therefore comtemplates a bumper hitch including a draft bar having a towing element mounted in its mid-section, and a pair of hitch assemblies attachable to the end of said draft bar, each hitch assembly also adapted to rest in facing relation against the surface of a bumper and to grasp the vehicle thereby to secure themselves thereto, the improvement lying in the hitch assembly comprising:

(a) a generally elongated U shaped member with an essentially flat spine extending into lateral arms, each arm defining an aperture through which the draft bar may extend;

(b) two adjacent finger members mounted at the upper regions of the U shaped member to define between them and the spine an open slit that extends from the spine toward the distal ends of the arms said slit adapted to accept a link of a chain;

(c) a level member having load, effort and fulcrum, the fulcrum pivotally attached to the upper distal regions of each arm and adapted to swing in a plane between said arms from below and beyond the distal ends of the arms to above and between the spine and the distal ends of the arms so as to rest its effort in superadjacent relation to said slit, the load pivotally disposed between effort and fulcrum and carrying a pivoting depending member that defines an accomodating recess for a link of a chain;

(d) upper and lower chains, each chain having attachment means at one end adapted for respective engagement with the automobile, the upper chain adapted to have one link mate into the upper slit, the lower chain having one of its links adapted to enter into said recess whereby on movement of the lever member from its lowest to its upper position the lower chain is caused to be pulled tight and to enwrap the draft bar and to urge the draft bar toward the spine, and into binding engagement with segments of each arm which define in part the aperture.

The invention will now be described by way of example and reference to the accompanying drawings in which.

Figure 8:
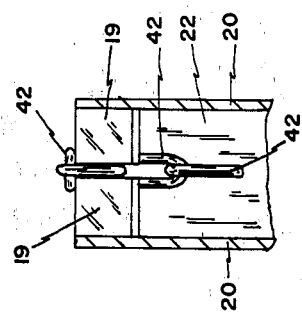
Figure 9:
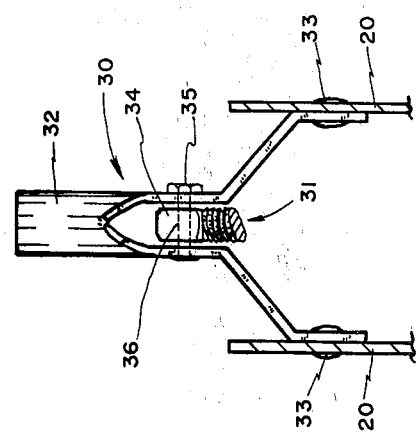
Figure 4:
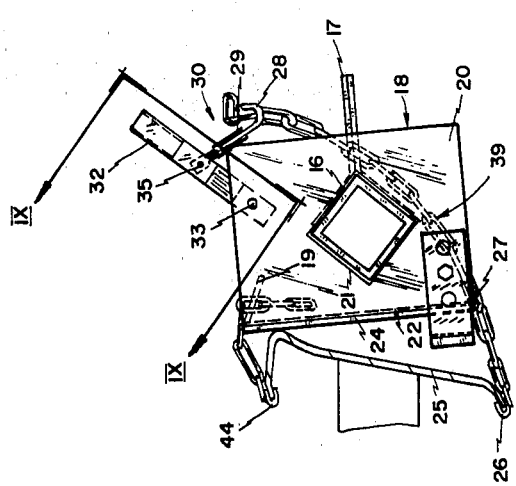
Figure 3:
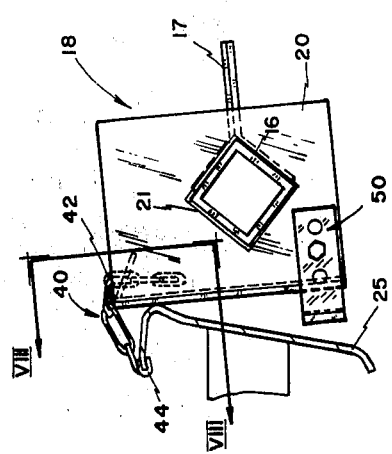

FIGS. 8 and 9, located with finger 1, are respectively sections along VIII—VIII and IX—IX of FIGS. 3 and 4.

Figure 10:
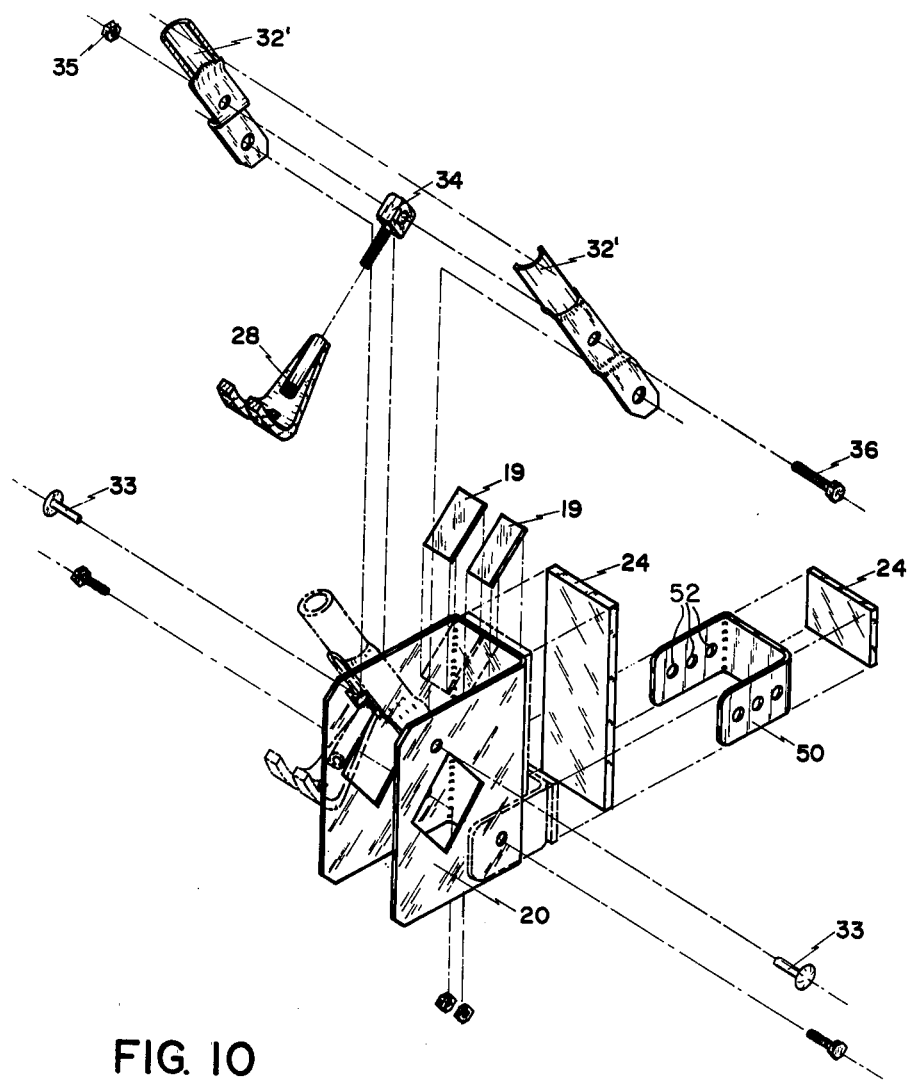

FIG. 10 is an assembly view of the hitch assembly

Figure 11:
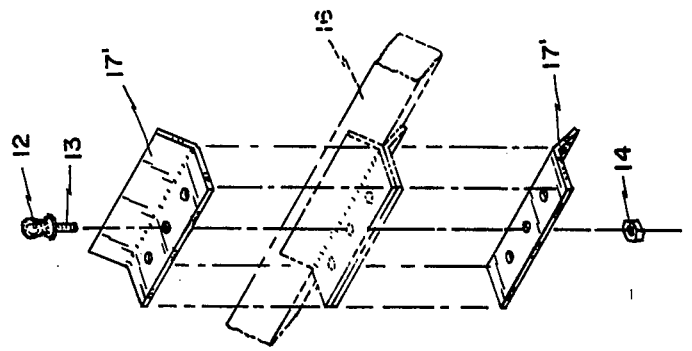
Figure 2:
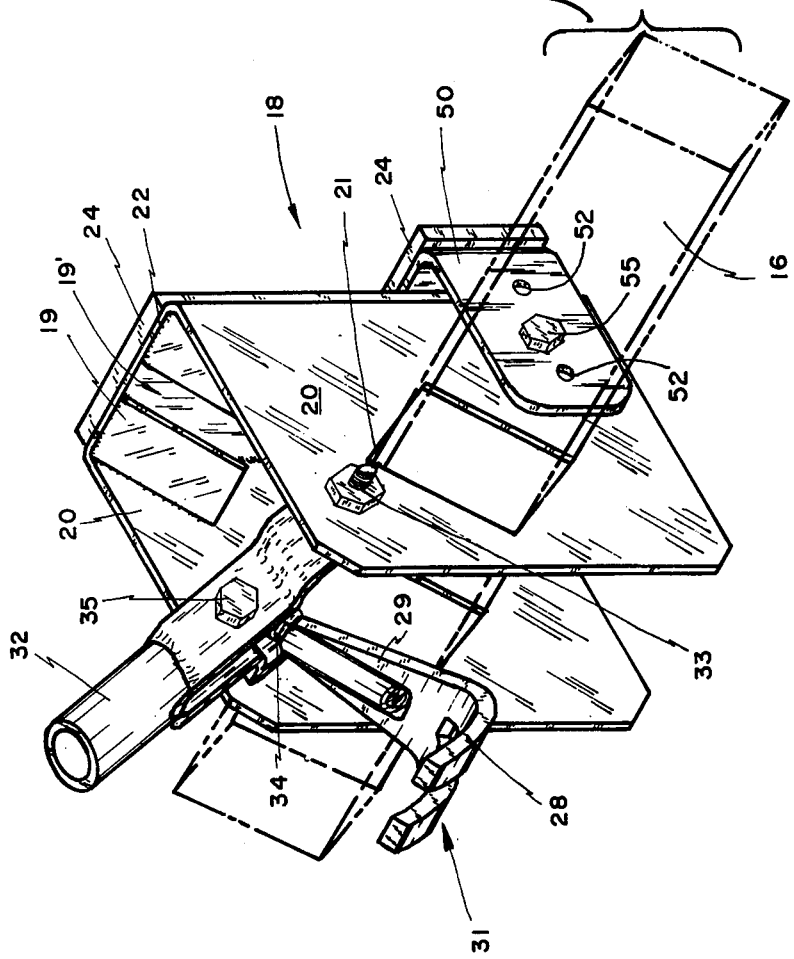
FIG. 2 is a perspective of the novel hitch assembly of FIG. 1.

FIG. 11 located with FIG. 2 is a broken assembly drawing of the draft bar.

Figure 1:
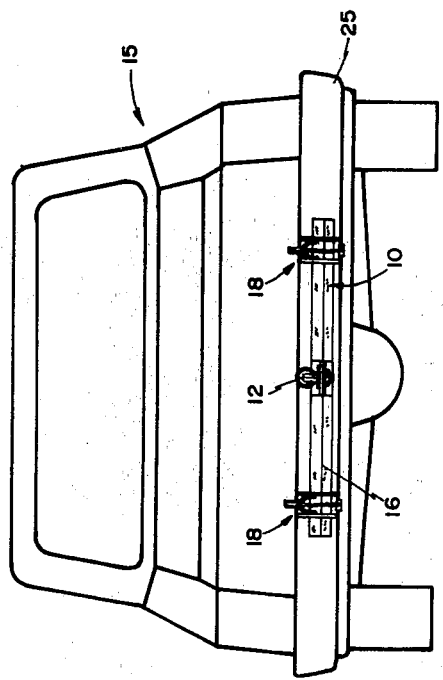
FIG. 1 is a plan view of a hitch incorporating embodiments of the invention.
Figure 5:
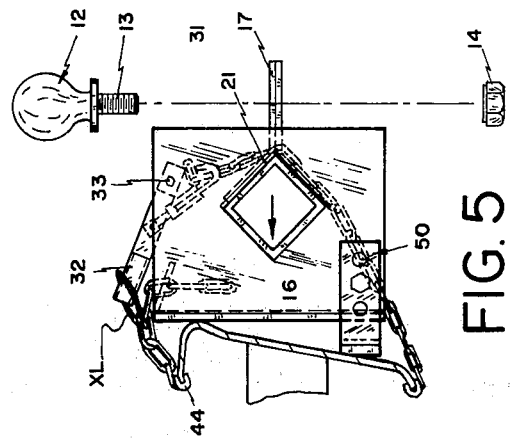
FIGS. 3 through 5 are side elevations to the hitch of FIG. 2 in various stages of assembly.

Referring to FIG. 1 a bumper hitch 10 includes a horizontal draft bar 16 generally formed from sheet material into a hollow square cross sectional member, a centrally mounted towing element 12 generally in the form of a ball tow, and laterally mounted hitch assemblies 18 which on the one hand grasp the draft bar and on the other hand the rear bumper 25 of the vehicle 15. The draft bar 16, in order to accomodate the towing element 12, has centrally located thereon a support flange 17. Referring to FIG. 5, the ball element 12 has a threaded shaft 13 which is adapted to extend through an aperture in the flange 17, not clearly seen, so as to allow bolt 14 to secure the two element onto the draft bar 16.

The assembly 18 consists of a generally elongated U shaped member with a flat spine 22 which extends into parallel and elongated arms 20. Each arm 20 defines an aperture 21 which is slightly larger in area and dimension than that of the draft bar 16. This is clearly seen in FIGS. 2 through 5, and as such allows the draft bar ends to be easily inserted through both arms of each assembly. A cushion pad 24, of resilient material, such as sponge rubber, is provided on the face of the spine 22 to provide a cushion between the spine and bumper when the assembly is mounted on the bumper. On the obverse face of the spine 22 and at the upper margin thereof are welded two inclined flat members 19 which act as fingers defining a slot 19' therebetween. The slot 19' is sized to accomodate a link 42 of an upper chain 40 which at one end has a hook 44 that engages over the upper margin of the bumper 25. It as easily could attach itself to the automobile body.

Preferably the fingers 19 are flat pieces and are inclined from the upper margin of the spine toward the center of each arm and hence toward the aperture 21—see FIGS. 3 through 5. The fingers are welded to the spine and along another margin to each arm so as to be welded to the U shaped member along two margins of each flat finger. This arrangement adds substantial strength to the U shaped member.

Figure 7:
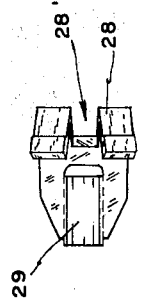
FIG. 7 is a plan view of the finger member of FIG. 6.

A pivoting lever member 30 is provided with pivoting mounts 33 attached to each arm near the upper and distal region of each arm substantially shown. The lever member 30 converges from the pivots 33 to extend as a solid straight piece and to define at its free end an effort region 32. Between effort region 32 and pivots 33 (which act as the fulcrum of the lever) a depending and pivoting finger member 31 is mounted. This depending finger member 31 includes a lower dual finger plate or member 28 that defines therein an accomodating slot 28' for a link 27 of a lower chain 39 which has at one end a hook 26 that engages the lower margin of the bumper 25 clearly as seen in FIGS. 4 and 7 or could likewise be connected to the automobile undercarriage if convenient.

Figure 6:
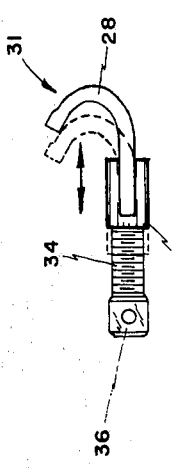
FIG. 6 is an exploded side view of a pivoting pair of fingers associated with the hitch assembly.

The finger member 28 also has an integral threaded receiving socket 29 that is adapted to matingly thread onto shaft 34 that has as its outer end a pivotal attachment (aperture 36), to the load of the lever member 30 as by nut and bolt arrangement 35 extending through the lever 30 and passing through the aperture 36 in the shaft 34. This is clearly seen in FIGS. 6 and 9.

Referring to FIGS. 3 through 5 assembly of the device takes places as follows.

Firstly, the upper chain 40 is mounted; a link thereof 42 is inserted into the upper finger slot 19' and the hook 44 thereof engaged over the upper margin of the bumper 25 all as shown in FIG. 3. The lower chain, generally indicated as 39 is then mounted. Firstly a link 27 thereof is placed into the recess 28' of the pivoting finger member 28. The lower hook 26 is then engaged onto the lower margin of the bumper 25. The draft bar 40 having been inserted into the aperture 21 the lever 30 is moved from the position of FIG. 4 into the position of FIG. 5. With this action to the load point moves from being positioned to the right of the fulcrum 33 to the left of the fulcrum 33 pulling the lower chain 34 so as to enwrap the chain against the draft bar 16 as clearly seen in FIG. 5 and to cause the draft bar 16 to move and to bind against those marginal segments margins of the aperture 21 that are most proximate the spine 22. By this conserted action the lever not only secures the assembly to the bumper 25 but the draft bar 16 to the assembly 18 with a single snap of each lever.

For fine adjustment of the effective length of the lower chain the relative distance between slot 28' prime and the load 35 can be minutely changed over a preferred range of distance of approximately one chain length, since the pivoting member 31 attaching to the load point is provided with the threaded shaft 34 and the mating socket 29 which readily changes these distances.

A lower U shaped support bracket 50 may be optionally provided in order to align the hitch assembly into a vertical plane relative to the bumper when the bumper has its lower face more recessed than its upper face substantially, as shown in FIGS. 3 through 5. The lower U bracket 50 has a cushion pad 24 along its spine face and the arms thereof are provided with three apertures 52 for adjustment by means of a nut and bolt arrangement 55 that extend through one of these apertures 52 and a corresponding aperture in the arms. Clearly, therefore, the arms 20 of the assembly members 18, must have an accomodating aperture, not shown, in the lower proximate regions thereof in order to accomodate the nut and bolt arrangement 55 and securement of lower U shape support member. In applications where the bumper does not have a profile such that the lower margin is more recessed than the upper margin the support bracket 50 is unnecessary.

In certain applications it is desired to have a safety device to hold the lever 30 in the closed position of FIG. 5. This can readily be accomodated by an extra link XL looped through one of the links of the upper chain 40; see FIG. 5, and over the effort region 32 of the lever. If desired the extra link XL may be a removable ring with ends spaced apart but overlapping so it can be turned into that particular clain link desired so that it can be positionally inserted into any desired chain link and then looped as shown in FIG. 5 over the effort 32 of the lever.

The embodiments of the invention in which an exclusive property or privilege is claimed are defined as follows:

1. In a trailer hitch including a draft bar, and a towing element mounted at the mid-section of said draft bar, the improvement comprising a hitch assembly for mounting each end of said draft bar to a vehicle bumper, said hitch assembly comprising:
   (a) a generally elongated U shaped member including an essentially flat spine adapted to rest in facing relationship against said bumper, and a pair of parallel arms extending from said spine in a direction away from said bumper, each of said arms having an aperture therethrough for receiving the ends of said draft bar;
   (b) two adjacent finger members mounted at the upper regions of the U shaped member to define between them and the spine an open slit that extends from the spine toward the distal ends of the arms, said slit adapted to accept a link of a chain;
   (c) a lever member having a first and a second end; means for pivotally attaching said first end to upper distal regions of said arms whereby said second end swings in a plane between said arms and parallel thereto from a lower position below and beyond the distal ends of said arms to an upper position above the upper edge of said spine; a depending member pivotally mounted on said lever member between said second end and said pivotally attaching means, said depending member having a slot therein;
   (d) upper and lower chains, each chain having attachment means at one end adapted for respective engagement with the automobile, the upper chain adapted to have one link mate into the upper slit, the lower chain having one of its links adapted to enter into said slot whereby on movement of the lever member from said lower to said upper position the lower chain is caused to be pulled tight and to enwrap the draft bar and to urge the draft bar toward the spine, and into binding engagement with segments of each arm which define in part the aperture.

2. The hitch as claimed in claim 1 including means for changing the relative distance between said one end of the lower chain and the attachment thereof to the lever.

3. The hitch assembly as claimed in claim 2 wherein the distance changing means includes a threaded shaft having one end pivotally attached to the lever, a mating securing socket for threadingly engaging said shaft, a finger member defining a slot for accomodating a link of the lower chain, the socket secured to the finger member.

4. The hitch as claimed in claim 1, 2 or 3 including a resilient surface, on the spine obverse to the arms.

5. The hitch as claimed in claim 1, 2 or 3 including a lower adjustment member having an engaging surface disposed in a plane non-coincident to that of the spine and on the obverse face from the arms, and means for attachment of said member to the lower regions of the arms proximate the spine.

6. The hitch as claimed in claim 1, 2 or 3 including means for constraining the second end of the lever into proximate relation with the upper margins of the spine, thereby constraining the load thereof into a position superadjacent the fulcrum.

* * * * *